(12) United States Patent
Österlund et al.

(10) Patent No.: US 7,853,352 B2
(45) Date of Patent: Dec. 14, 2010

(54) METHOD OF SELF CALIBRATING A POSITIONING SYSTEM FOR POSITIONING AN ELEMENT IN A WORKING SPACE

(75) Inventors: Peter Österlund, Sköndal (SE); Roger Jonasson, Stockholm (SE)

(73) Assignee: Mydata Automation AB, Bromma (SE)

( * ) Notice: Subject to any disclaimer, the term of this patent is extended or adjusted under 35 U.S.C. 154(b) by 423 days.

(21) Appl. No.: 11/885,797

(22) PCT Filed: Mar. 3, 2006

(86) PCT No.: PCT/EP2006/002156
§ 371 (c)(1),
(2), (4) Date: Jan. 8, 2008

(87) PCT Pub. No.: WO2006/099951
PCT Pub. Date: Sep. 28, 2006

(65) Prior Publication Data
US 2008/0195343 A1    Aug. 14, 2008

(30) Foreign Application Priority Data
Mar. 8, 2005    (EP) ................... 05101797

(51) Int. Cl.
*G06F 19/00* (2006.01)
*G06K 9/00* (2006.01)
*G05B 19/18* (2006.01)

(52) U.S. Cl. .................. 700/194; 700/56; 700/58; 700/159; 700/193; 700/195; 382/140; 382/144; 382/147; 382/151

(58) Field of Classification Search ............ 700/56–58, 700/159, 193–195; 708/422; 382/140, 144, 382/147, 151
See application file for complete search history.

(56) References Cited

U.S. PATENT DOCUMENTS

| 4,583,298 A |   | 4/1986 | Raugh |
|---|---|---|---|
| 5,086,478 A | * | 2/1992 | Kelly-Mahaffey et al. .. 382/151 |
| 5,798,947 A |   | 8/1998 | Ye et al. |
| 6,047,084 A | * | 4/2000 | Kent et al. .................. 382/147 |

(Continued)

FOREIGN PATENT DOCUMENTS

DE    27 39 527 B1    8/1978

(Continued)

OTHER PUBLICATIONS

Kruth J P et al., "Self-calibration method and software error correction for three-dimensional coordinate measuring machines using artifact measuring", Measurement, Institute of Measurement and Control, 14 (Dec. 1994), pp. 157-167.

(Continued)

*Primary Examiner*—Ramesh B Patel
(74) *Attorney, Agent, or Firm*—Birch, Stewart, Kolasch & Birch, LLP

(57) ABSTRACT

A method of self calibrating a positioning system, by positioning a reference device provided with reference markings at different calibration locations, and sensing the positions of the reference markings at each calibration location, is provided. The calibration parameters are selected such that differences in relative positions of the sensed locations, expressed in actual coordinates for different calibration locations are reduced or preferably minimized.

20 Claims, 6 Drawing Sheets

U.S. PATENT DOCUMENTS

| | | | | |
|---|---|---|---|---|
| 6,163,946 | A * | 12/2000 | Pryor | 29/407.04 |
| 6,408,429 | B1 * | 6/2002 | Marrion et al. | 717/100 |
| 6,522,777 | B1 * | 2/2003 | Paulsen et al. | 382/154 |
| 6,526,165 | B1 * | 2/2003 | Montillo et al. | 382/145 |
| 6,681,145 | B1 * | 1/2004 | Greenwood et al. | 700/193 |
| 6,850,806 | B2 * | 2/2005 | Yutkowitz | 700/54 |
| 7,181,058 | B2 * | 2/2007 | Weisgerber et al. | 382/145 |
| 2003/0016859 | A1 * | 1/2003 | Weisgerber et al. | 382/150 |
| 2003/0053679 | A1 | 3/2003 | Horn et al. | |
| 2003/0056147 | A1 * | 3/2003 | Yutkowitz | 714/25 |
| 2004/0254673 | A1 | 12/2004 | Tomelleri | |
| 2005/0119783 | A1 * | 6/2005 | Brisson et al. | 700/186 |
| 2006/0217037 | A1 * | 9/2006 | Kalanovic | 451/5 |

FOREIGN PATENT DOCUMENTS

| | | |
|---|---|---|
| JP | 8-16787 A | 1/1996 |

OTHER PUBLICATIONS

Partial Translation of a Japanese Office Action dated May 25, 2010, for Application No. 2008-500122.

* cited by examiner

METHOD OF SELF CALIBRATING A POSITIONING SYSTEM FOR POSITIONING AN ELEMENT IN A WORKING SPACE

TECHNICAL FIELD

The present invention relates to positioning systems, and in particular to a method of self-calibrating a positioning system for positioning an element in relation to a working space.

TECHNICAL BACKGROUND

Positioning systems are used in a wide variety of fields, wherein the basic principles of the systems are normally the same. In general, a positioning system is used to move one or several elements to a respective desired location in a working space, often such that a work head is positioned at a desired location in relation to a target space. The elements are usually work heads and/or target spaces, which are positioned at a desired location entered into the machine, by the use of positioning means controlled by a control unit.

Herein, the term working space refers to a space comprising the coordinates at which the element(s) can be positioned by the positioning system. Further, if items or material can be placed at predetermined locations on e.g. the target space, by for instance a mounting head or dispensing head, these locations are normally also comprised in the working space.

There are many alternative ways of arranging the control of the positioning of a work head in relation to a target space. In some systems, the work head is fixed, and the target space is moved by the positioning system such that the work head is positioned correctly in relation to the target space. In other systems the target space is fixed, and the work head is moved by the positioning system. In yet other systems, both the work head and the target space are moved by the positioning system. In for example a split axis machine the work head is moved along a first axis, and the target space is moved along a second substantially orthogonal axis.

The working space, or at least a portion of the working space, is normally spanned by two different sets of coordinate systems, one actual or real coordinate system and one nominal or machine coordinate system. Additionally, there is a set of conversion values for transforming a coordinate expressed in one of the coordinate systems, into a corresponding coordinate expressed in the other coordinate system. This is sometimes referred to as mapping.

Herein, the term actual coordinate system refers to a coordinate system which is independent of the positioning system, generally orthonormal, and normally the coordinate system which the user is most familiar with. Typically, CAD data related to the target space is first described in the actual coordinate system and later converted into the nominal coordinate system.

The term nominal coordinate system refers to a coordinate system which is determined by the structure and properties of the positioning system. The nominal coordinate system is in most cases not perfectly orthonormal due to imperfections in the positioning system, such as misalignment of a positioning axis, or roll, pitch and yaw associated with the positioning of the work head.

The term conversion values refers to a set of numerical values, which are used for converting or transforming an actual coordinate into a nominal coordinate, or vice versa. Usually, one aim when calibrating a positioning system is to determine the conversion values, such that when they are applied to an actual coordinate, indicating a first location in said working space, the result is a nominal coordinate indicating the exact same location. Such a pair of actual and nominal coordinates are referred to as a corresponding pair of coordinates. Hence, if correct values are entered into the machine and if the positioning system is perfectly calibrated, i.e. the conversion values are ideal, then there will be no difference between the desired position of the element and its actual location after it has been positioned by the positioning system.

A conventional method of calibrating a three-dimensional positioning system, wherein the target space is two dimensional, e.g. a circuit board, is to use a calibration board which essentially covers the target surface of the positioning system. The calibration board is provided with reference markings and the location of each reference marking on the calibration board is known with better accuracy than the required accuracy of the positioning system. The locations of the reference markings are measured by one or more sensors, which scan the calibration board under the control of the positioning system. The sensed location of each reference marking in nominal coordinates is compared to their respective known locations in actual coordinates, and a corresponding correction value is computed for each reference marking on the reference board.

After the calibration, nominal coordinates within a portion of said working space will be calibrated. A selected working space refers herein to a portion of the working space which is to be calibrated. A selected portion of the working space might comprise the whole of said working space.

There are problems related to the above described calibration procedure used in prior art. First of all, there is a practical concern. Different machines have target spaces of different sizes. In order to be able to calibrate the whole target space for all types of machines, the operator conventionally uses a set of different calibration boards, one for each size of target space. Alternatively, a calibration board which fits the smallest target space can be used in all machines, but this may leave portions of the target space uncalibrated.

Another concern is the cost for manufacturing large calibration boards which provides for a sufficiently high accuracy. Particularly as these boards should withstand at least moderate variations in temperature and also be durable over time. This puts high demands on the materials as well as the manufacturing processes used. If the quality of the calibration is not sufficiently high, due to for example a poor calibration board, the accuracy of the positioning system will be affected accordingly.

The accuracy in the positioning of the work head is crucial in many applications, e.g. in machines used in relation to circuit board manufacturing, and specifically to the steps required for circuit board assembly.

There are several different types of machines which are used in relation to circuit board assembly, e.g. dispensing, mounting and/or inspection machines.

In a component mounting machine, the work head or component placement head is used to pick a desired electric component from a supply of components, and place the component at a desired location on the circuit board. It is important that the components are correctly attached to the circuit board, and even more important that they are placed with high accuracy. Otherwise, the risk of a subsequent malfunction of the board is impending.

In a dispensing machine, a work head or dispensing head holds a dispenser which distributes a viscous medium, e.g. solder paste, glue or underfill, with high accuracy in desired positions on a circuit board, in order to attach electric components to the board. The arrangement of said viscous medium is critical, as mistakes often cause an unsatisfactory connection between the component and the board.

There are several types of automatic inspection machines, e.g. one which uses X-rays and another which uses visible light. In both of these systems, a work head or optical inspection head is used to position a detector, which is sensitive to the electromagnetic radiation in question, such that the attachment, location and orientation of the mounted components and/or the applied viscous medium can be verified. Other types of inspection machines use touch probes for contact inspection of objects. Then, the touch probe is mounted on a work head controlled by a positioning system.

The term self calibration refers to the use of an imperfectly calibrated measuring instrument and one or more imperfectly calibrated reference device(s) to improve the calibration of the instrument and the reference device(s), wherein said measuring instrument is used by e.g. a positioning system.

When a reference device is imperfectly calibrated, the relative positions between the reference features are not known with a sufficient accuracy, an accuracy that e.g. is substantially higher than the accuracy one wants to achieve for the positioning system after calibration. The reason that the reference device is imperfectly calibrated may be that the reference device has never been measured with such an sufficient accuracy or changes in the reference device due to wear or thermal variations.

There is an ever increasing demand for smaller circuitry based consumer products. In order to meet this demand, the accuracy of the positioning systems must normally be improved accordingly, such that smaller tolerances can be achieved. It is also desirable that the idle time of the machine is as short as possible.

SUMMARY OF THE INVENTION

One object of the invention is to provide a calibration method which eliminates or at least alleviates the above described problems. This object is achieved by a calibration method in accordance with the appended claim 1. Preferred embodiments are defined in the dependent claims.

According to one aspect thereof, the present invention provides a method of self calibrating a positioning system for positioning an element in a working space, which comprises the steps of providing a system of actual coordinates, a system of nominal coordinates and a set of conversion functions for converting between the actual coordinates and the nominal coordinates, wherein said functions are determined by at least one conversion parameter. Furthermore, said calibration method comprises the step of non-manually positioning a reference device at a plurality of different calibration locations in a working space of said positioning system, wherein said reference device comprises a plurality of discernable reference features, arranged at substantially fixed relative positions. Said calibration method also comprises the step of sensing, for each calibration location, the position of at least any two of said reference features in nominal coordinates by non-contact measurements. Finally, the method comprises the step of selecting numerical values for each of said conversion parameters such that differences in relative positions of said sensed locations expressed in said actual coordinates for different calibration locations are reduced or preferably minimized.

An advantage associated with the above mentioned aspect of the invention is that the same method and calibration device can be used, independently of the size of the selected working space, i.e. the portion of the working space which is to be calibrated. This simplifies the calibration of differently sized positioning systems.

The present invention is based on the insight that it is possible to achieve a highly accurate calibration of a positioning system, by placing a reference device at different calibration locations in the working space of the positioning system. The method is based on substantially two assumptions: that the position and the orientation of the reference device remains constant as long as the reference device remains in the same calibration location; and that the properties of the reference device, such as the relative distance between the reference features, remain substantially unchanged between different calibration locations.

The invention is based on the idea that if there are differences in the measured distance between e.g. a first and a second reference feature for different calibration locations, these differences probably stem from inaccuracies in the positioning system, since the relative positions of the reference features are assumed to be fixed. One aim when selecting numerical values for the conversion parameters, is to select these such that the above described differences are minimized or at least reduced.

Herein, the term discernable reference features is used to denote a characteristic of the reference device, such as e.g. a corner or a marking, that can be sensed or recognized by the sensing device. The sensing device can sense the reference features by means of e.g. contact measurements, wherein a needle or the like is used to scan a surface, as is known to the man skilled in the art. Alternatively, non-contact measurements can be used wherein a detector which is sensitive to variations of a physical parameter, such as laser generated light, visible light, X-rays, magnetic fields or electrostatic fields, is used. A camera is one example of such a detector, which can be used for non-contact measurements. Detection and image processing methods for sensing reference features of the device are well known to a person skilled in the art and will not be described in any more detail. The location of said reference features are determined by the positioning system and the sensing device in nominal coordinates.

The term "arranged at substantially fixed relative positions" refers herein to the mutual distances between the different reference features remaining basically un-changed, with respect to the reference device. In other words, the reference device is manufactured of such a material, and the reference features are arranged in such a manner, that the actual distance between any two reference features can be assumed to be substantially constant. The term "substantially fixed" is used because basically all materials are more or less affected by thermal variations. The reference device, the sensing device and the positioning system are preferably arranged such that a possible change in relative position of the reference features, is too small to be detectable by the positioning system during the measurement in one calibration location. This is preferably achieved by manufacturing the reference device of a thermally stable material, such as steel or glass. Examples of suitable glass materials are fused silica and borosilicate. Advantageously, the reference device is made of a material which quickly evens out any internal difference in temperature, i.e. it has high thermal conductivity, and/or has a low thermal expansion. The reference features are preferably provided on the reference device by means of etching, printing or chroming.

In this text, the term "function" refers to a mathematical expression, e.g. 3x+c, "parameter" to an unknown value, e.g. d, and "numerical value" to a determined value, e.g. 43.

The term positioning the reference device at a calibration location comprises both to the act of positioning and holding the reference device at a desired calibration location, and the act of positioning and releasing the reference device at a desired calibration location.

According to one preferred embodiment, said reference device is small, i.e. substantially smaller than the selected working space, such that an easy handling by a work head is enabled. A small reference device can easily be placed at several different overlapping locations in the selected working space. Preferably, the different calibration locations should cover as large an area of the selected working space as possible, although this has to be balanced against e.g. the total time required for repositioning the reference device. A small reference device also facilitates the use of the same calibration method and calibration materials when calibrating several different positioning systems. In other words, said reference device is to be preferably smaller than the total space or area, which is calibrated by the measurement of said reference device at said calibration locations. This space is in most cases larger than the space formed by the sum of said calibration locations. This is explained in more detail in relation to FIGS. 4a-4c.

Advantageously, the calibration method comprises positioning the reference device with a partial overlap at one or several different calibration locations. In other words, different portions of the reference device are positioned in the same portion of the selected working space for at least two calibration locations. Thereby, a higher accuracy of the calibration can be achieved since a larger statistical material is obtained. The positioning of different portions of the reference device in the same portion of the selected working space can be performed with respect to one or several absolute coordinates. In other words, different portions of the reference device are positioned at the same portion of the selected working space for at least two spatially adjacent calibration locations, which are herein referred to as spatially overlapping calibration locations. In yet other words, the positioning is performed such that different portions of the reference device are positioned in the same portion of the selected working space with respect to three orthogonal axial directions.

Alternatively, the positioning can be performed with an overlap in one dimension and not in another. For example, when a split axis positioning system is calibrated, the higher accuracy of the calibration can also be achieved by positioning the reference device at least two different, spatially non-overlapping portions of the selected working space, which both correspond to the same portion of the axis to be calibrated. In other words, when e.g. the X-axis of the positioning system is to be calibrated, the reference device can be positioned at a first and a second portion of the selected working space, which both correspond to the same X-axis coordinate but different Y-axis coordinates, wherein said Y-axis coordinates might be substantially different and located e.g. at two ends of the working space. In yet other words, different portions of the reference device are positioned in the same portion of the working space with respect to one or two axial directions. Correspondingly, the positioning of different portions of the reference device at two spatially overlapping calibration locations can also be referred to as positioning different portions of the reference device in the same portion of the selected working space with respect to three orthogonal axial directions.

Preferably, the positioning of said reference device is performed by a work head, as this is generally more time effective compared to a manual reposition of the reference device. Moreover, a manual repositioning might make the result of the calibration process dependent on the skill of the operator, at least with respect to the time required for the calibration process. Further, it is often preferred to use the positioning system and work head, which are to be calibrated, for positioning the calibration plate. Alternatively, the reference device can be positioned by a separate repositioning means, which is not controlled by the positioning system. A non-manual positioning of the reference device refers to a positioning of the reference device that is not performed manually, i.e. that is performed by automatized positioning means, such as a work head, which may be controlled by said positioning system as described above.

Advantageously, the reference features of the reference device are measured in a substantially random order, and/or the positioning of the reference device at the different calibration locations is performed in a substantially random order. In this way, the effect of e.g. temperature dependence and/or sensor drift is reduced.

However, the measurement process does not need to be totally random, e.g. the sensing device can start measuring the same reference feature for all or some calibration locations.

Advantageously, the calibration method is used for a positioning system, which is used in circuit board manufacturing machines. Said positioning system can for example be used in component mounting machines ("pick-and-place machines") dispensing machines, automatic optic inspection ("AOI") machines, automated X-ray machines, or machines which are a combination of these.

Advantageously, said reference features are fiducial markings that have been arranged on said reference device, preferably at regular intervals. Said reference features can be arranged in sets, which sets are arranged with preferably regular intervals on said reference device. The type and arrangement of said fiducial markings are preferably chosen such that they are easily detectable by said sensing device. For example, said markings can have a square or circular shape with diameter of 1 mm, as this corresponds to a typical size of circuit board orientation marks. Hence, an existing sensing device, used for locating these marks, can be used for locating the markings on the reference device.

According to one embodiment of the invention, said step of positioning said reference device comprises positioning it on a two-dimensional target space or target surface. When the positioning system is comprised in a machine used in relation to circuit board assembly, the target surface can be e.g. an empty surface whereon the circuit boards are placed at assembly procedures, one or several circuit boards in their assembly positions, or one or several flat boards arranged at the assembly positions instead of the circuit boards. These flat boards might be provided with markings indicating the different calibration locations. An element or work head can be used for placing components on the target surface or within the selected working space, and/or for determining whether placed objects have a correct position. A different type of element or work head can be used for dispensing material, e.g. adhesive, flux or solder paste and/or determining whether dispensed material was correctly positioned on the target surface.

Preferably, the reference device should not be repositioned more than required to obtain the desired accuracy, in order not to negatively affect time efficiency of the calibration procedure. This is due to the fact that each repositioning introduces additional unknown variables, and possibly also small positioning errors. Further, each repositioning and corresponding measurement takes time, which slows down the calibration procedure. Hence, the reference device preferably contains a large number of reference features, in order to enable enough positioning data to be collected by the positioning system and the sensing device at each location. Additionally, a larger number of densely spaced reference features reduces the need to reposition the device at over-lapping reference locations, for collecting enough measurement data for a reliable calibration. In order for the reference device to be arranged with this high number of reference features, the reference device is preferably relatively large.

On the other hand, a larger reference device, possibly with a high number of reference features, could entail drawbacks. First of all, a larger reference device is generally more difficult for the positioning system to handle. A smaller device is generally easier to reposition. Furthermore, a larger reference device, which comprises a larger number of reference features, normally takes more time for the sensing device to measure. During this time period the relative position of the reference features might change, due to e.g. thermal expansion.

The calibration method according to the invention is based on the relative position of the reference features remaining fixed, for measurements made while the reference device is in the same calibration location. Therefore, changes related to the reference features that occur during measurements which are performed while the reference device remains in one calibration location, is normally difficult to compensate for by the calibration method. This is contrary to temperature variations that occur between two calibration locations, these are compensated for automatically by the inventive calibration method. A general characteristic of the calibration method is that the accuracy in the positioning of the reference device is not essential for the calibration result, a variation in e.g. the position of the reference features will generally be interpreted as a displacement from the intended calibration location. Consequently, the design of the reference device is normally a compromise between many different requirements, of which some examples have been given above. A difference in temperature might also cause an axis comprised in the positioning system to expand or contract. Hence, if the temperature of an axis changes from a first temperature to a second temperature, a position in nominal coordinates corresponding to a first position in actual coordinates when the axis has a first temperature, might later correspond to a second different position when the axis has the second temperature. Such a change will also be interpreted as a displacement from the intended calibration location, if it occurs between two calibration locations. The effect can be reduced by positioning the reference device in a random order.

According to one embodiment, comprising a two-dimensional selected working space, the reference device is preferably shaped like a plate, i.e. it is a thin and flat piece of material, which is easily handled by the machine. Advantageously, the reference features are arranged on the reference device in such a way that they are easily located by the sensing device. They can e.g. be placed in one or several substantially straight lines. The reference features can be arranged at regular or irregular intervals, which preferably is known by the positioning system such that the sensing device can be directed to their approximate position. An advantage related to arranging the reference features in an irregular pattern, is that the possibility of the reference features having the same distribution as a possible cyclic error in the positioning system is avoided. Hence, possible alias effects can be avoided. The pattern can be fully or partly irregular. In a fully irregular pattern, no portion of the pattern is repeated in a regular fashion. Herein, a partly irregular or quasi-irregular pattern comprises one or several fully irregular patterns, which are repeated in a regular fashion.

If the reference features are arranged in more than one line, the reference features of different lines preferably have an off-set in relation to each other, which facilitates a more dense arrangement of the reference features. Further, several lines of reference features, which lines are separated by a first distance, might be grouped into a row of reference features. The reference device can be provided with several such rows, which rows are separated by second distance, which is larger than said first distance. Preferably, the arrangement of the reference features is asymmetric with respect to the reference device, such that the sensing means is able to determine the orientation of the reference device. In a preferred example, the reference device comprises orientation markings, by which the sensing device can determine the orientation of the reference device in the working space.

Advantageously, mechanical errors in a machine can be approximated by piecewise linear functions or cubic spline functions. Such functions are typically represented by a calibration table that specifies the conversion values for a number of equidistant nominal coordinates. The distance between adjacent entries in the calibration table determines how many entries the calibration table will contain for a given working space size. A requirement for the calibration to be accurate, is generally that the number of equations in the equation system is at least as large as the number of unknown variables. In a calibration of an n-dimensional working space, the total number of variables in the equation system is $$d*r + \left(n + \sum_{i=1}^{d}(n-i)\right)*p + v, \quad (1)$$

where d is the number of dimension in the arrangement of the reference features, e.g. d=1 for a line of reference features and d=2 for a matrix of reference features, n is the number of dimensions of the working space, r is the number of reference features on the reference device, p is the number of calibration locations, and v is the number of independent variables in the calibration table.

The total number of equations is $$n*p*r + d + 1 + \sum_{i=1}^{d}(d-i) = n*p*r + \frac{d*(d+1)}{2} + 1, \quad (2),(3)$$

because for each of the p calibration locations, r reference features are located, and each measurement results in n values. The number of equations exceeding n*p*r come from the fact that the translation, rotation and scale of the reference device coordinate system should be specified. This leads to the following necessary condition for a successful calibration:

$$n*p*r + \frac{d*(d+1)}{2} + 1 \geq d*r + \left(n + \sum_{i=1}^{d}(n-i)\right)*p + v, \quad (4)$$

which equals:

-continued $$p \geq \frac{dr + v - \frac{d(d+1)}{2} - 1}{nr - n - \frac{d(2n-d-1)}{2}}. \quad (5)$$

In practice, it is desirable to make p larger than required by this equation in order to introduce additional redundancy in the equation system and to reduce the effects of random measurements errors. On the other hand, p should be sufficiently small, such that the measurements can be completed within an acceptable time period. Having 3.5 times as many equations as unknowns is a compromise which has shown good result. Preferably, all unknown variables in the calibration table should be present in the equation system. This means that the sensed locations of the reference features should preferably at the most be separated by substantially the same distance as the actual distance between two entries in the calibration table. Further, the calibration locations should preferably be distributed over the selected working space in such a manner that it makes the equation system well behaved (i.e. such that it has a low condition number). The calibration locations should preferably also be spread out fairly evenly over the selected working space, such that different parts of the selected working space are considered equally important in a least square optimization problem, used when finding a solution to the equation system.

Advantageously, the numerical values of the conversion parameters are determined without the use of any other numerical information than the measured positions of the reference features expressed in nominal coordinates. Any first coordinate $N^N$ expressed in nominal coordinates can be converted into a corresponding coordinate $A^{AC}$ expressed in actual coordinates by use of the equation: $A^{AC}=f(N^N,c_1,c_2,c_3, \ldots c_v)$, wherein f( ) is a suitable function and $c_i$ is the calibration parameters.

A two-dimensional example, suitable for a split axis machine, of an approximate transform from of a nominal coordinate $(N_x, N_y)$ to a corresponding actual coordinate $(A_x, A_y)$ is given by:

$$A_x = f_{1x}(N_x) + f_{2x}(N_y) \quad (6)$$

$$A_y = f_{1y}(N_x) + f_{2y}(N_y) + f_{3y}(N_y)^* N_x, \quad (7)$$

where $f_{ni}$ are suitable functions. $f_{ni}$ can e.g. be piecewise linear functions, cubic spline functions or sets of fourier series.

All sensed positions of the reference features can be converted into actual coordinates by use of the above relationship.

When the reference device is arranged in one calibration location, the position of its reference features can theoretically be expressed in actual coordinates, without the use of numerical values, by e.g. the following procedure. First, the positions of the reference features are described, with respect to a point of reference on the reference device, e.g. a first reference feature or a corner of the reference device. The positions can be described by a vector $f^R$, which for two dimensions could be expressed as $(f_{x1},f_{x2},f_{x3},f_{x4} \ldots ; f_{y1},f_{y2},f_{y3},f_{y4} \ldots )^R$, where $(f_{xi},f_{yi})^R$ represents the coordinate of the i:th reference feature taken from said first point of reference. In other words, $f^R$ describes the relative positions of the reference features. Using the assumption that the point of reference is positioned at a coordinate $R^{AC}$=e.g. $(r_x,r_y)^{AC}$, and the reference device has an inclination v to the x-axis and possibly w to the z-axis (actual coordinates), the vector $f^R$ can be converted into actual coordinates by the expression:

$$f^{AC}=M(v,w)^*f^R+R^{AC}, \quad (8)$$

where M(v, w) is an orientation matrix, which describes the rotation of the reference device. A two-dimensional example:

$$f_{x1}^{AC}=r_x^{AC}+\cos(v)^*f_{x1}^R-\sin(v)^*f_{y1}^R \quad (9)$$

$$f_{y1}^{AC}=r_y^{AC}+\sin(v)^*f_{x1}^R+\cos(v)^*f_{y1}^R. \quad (10)$$

An overdetermined system of equations can be arranged by equating the right hand side of the first set of equations (6), (7) to the right hand side of the second set of equations (9), (10) for a sufficient number of calibration locations and reference features. Additionally, some boundary conditions are introduced according to standard procedures known in the art. Hence, suitable numerical values for the conversion parameters $f_{ni}$ can be determined by mathematical optimization methods known in the art.

As there is often no exact solution to an over-determined system of equations Ax=b, an optimized solution x can be found if x is determined such that the residual vector r=b-Ax becomes small. The residual vector can be used for determining the error of the solution, as is known in the art. For instance, the Gauss-Newton method can be used to perform a least-square approximation, wherein the Euclidian norm of the residual vector is reduced or minimized. The standard deviation of the residual vector is proportional to the Euclidian norm. Consequently, not only will the Euclidian norm be reduced by the Gauss-Newton method, but also the standard deviation of the residual vector. This is advantageous as the standard deviation can be used as is an indication of the accuracy of the calibration.

There are alternative norms which can be optimized in order to reduce or minimize the residual vector, one example is the max-norm. In other words, the equation system is solved by finding a solution which makes the largest value of the residual vector as small as possible. The max-norm is advantageous to use in e.g. a situation where the measurement errors are small, and where it is more important to keep the measurement error small than achieving a small standard deviation.

According to one embodiment of the invention a first large set of calibration locations are initially selected, e.g. such that there are 3.5 times as many equations as unknowns. The calibration is performed in a similar manner to what has been described above, and a first value of the accuracy of the calibration is computed, e.g. the standard deviation of the residual vector as described above. Thereafter a first subset of calibration locations is selected, and measurements are performed at these locations. This first subset substantially comprises calibration locations which are comprised in said first large set of calibration location, but might also comprise some additional calibration locations. Further, said first subset might also comprise only one calibration location. The results of the measurements in said first subset are added to the equation system, and equations corresponding to previous measurements in these locations are removed. A second value of the accuracy of the calibration is computed. If the accuracy is not sufficient a second subset of calibration locations is selected, and measurements are performed at these locations. This second subset either substantially equals said first subset, or comprises calibration locations which are comprised only in said first large set, and not in said first subset. This second subset might also comprise some additional calibration locations, e.g. calibration locations not comprised in said first large set or calibration locations comprised in said first subset. A third value of the accuracy of the calibration is computed. The procedure of selecting and measuring at additional subsets is repeated e.g. until the computed accuracy of the calibration is good enough or the difference in accuracy between subsequent calibrations is sufficiently small. One advantage related to this embodiment is that the size of the equation system is kept constant, although a larger number of measurements are performed. Another advantage is that the method has an inherent ability to determine when the calibration is accurate enough. For example, if the temperature of the axes of the positioning system changes substantially while the machine is calibrated, the accuracy of the calibration will not be determined as sufficient until the axes have reached a constant temperature. This is e.g. particularly useful when the calibration is performed on an initially "cold" or unused machine.

The gist of the invention is that an accurate calibration of the conversion values can be performed substantially under no other assumption than the position and orientation of the reference device remaining the same, as long as the reference device remains at the same calibration location. In other words, before the calibration session, it is not required that the reference features are arranged with a certain accuracy on the reference device, or that the position of the markings are known with a certain accuracy. Hence, the manufacturing cost of the reference device can be kept down.

These and other aspects of the invention will be apparent from, and elucidated with reference to, the embodiments described hereinafter.

DETAILED DESCRIPTION OF PREFERRED EMBODIMENTS

Figure 1A:
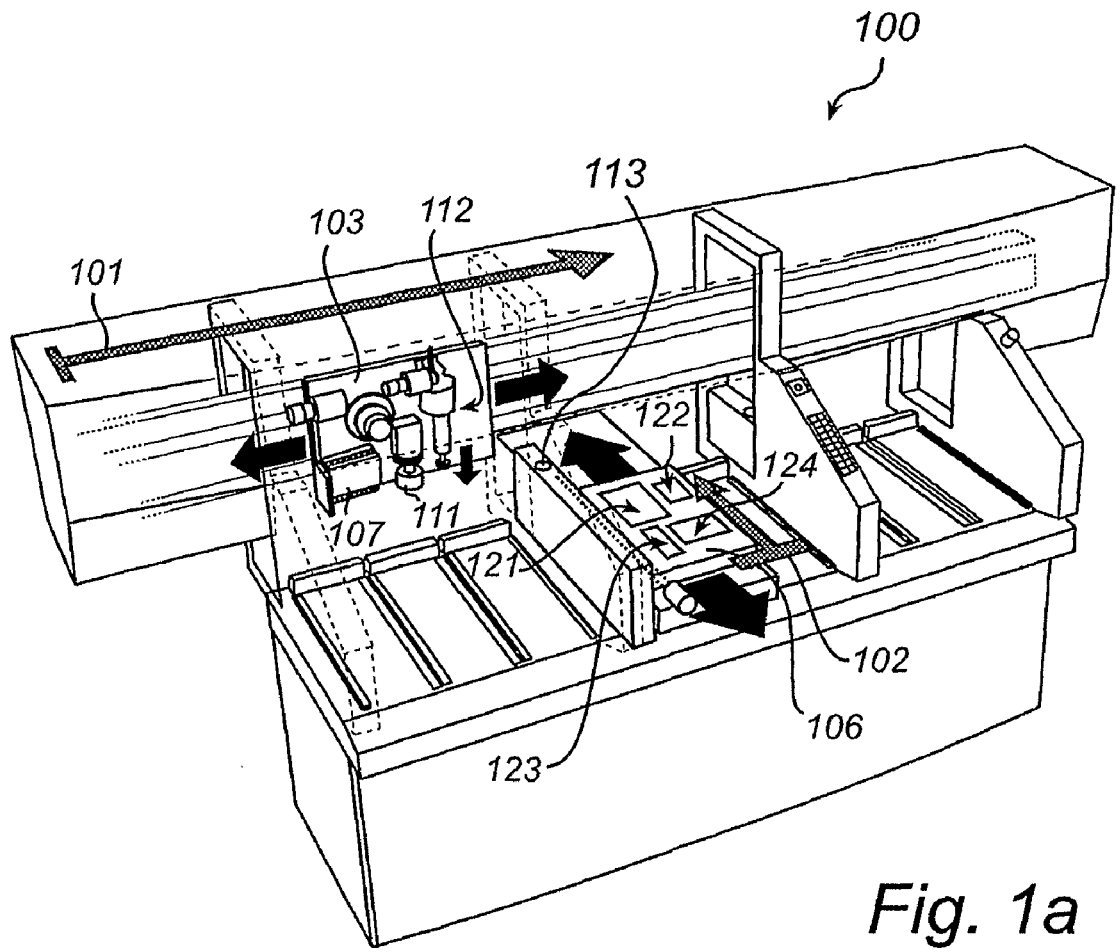
FIGS. 1a and 1b show schematic views of a split axis positioning system and a working space, respectively.

FIG. 1a schematically shows a pick and place machine 100 for mounting electric components on printed circuit boards 121-124. The machine is of a type called split axis. In other words, the machine comprises a first axis 101, along which a sensing device 111 and an element or work head 112 is moved, and a second axis 102 along which a target surface 106 or circuit boards 121-124 are moved. The axes 101, 102 are in most cases substantially, but not truly, orthogonal. The machine comprises a positioning system for positioning the work head 112 at a desired location in relation to the circuit boards 121-124. Further, the positioning system comprises linear motors (not shown) for movement of two support members 103, 106, to which e.g. the circuit boards 121-124 and the sensing device 111 are attached, respectively. The support member 106, whereto the circuit boards are attached, corresponds to the target surface of the positioning system, wherein e.g. components can be placed by the work head 112. The machine also comprises a control unit 107, e.g. a micro processor, for controlling the linear motors. The work head 112 is used for picking components and placing them on the circuit boards 121-124. The sensing device 111 is a camera, which is connected to an image processing system, and used e.g. for calibrating the positioning system and verifying the position and orientation of the circuit boards.

Figure 1B:
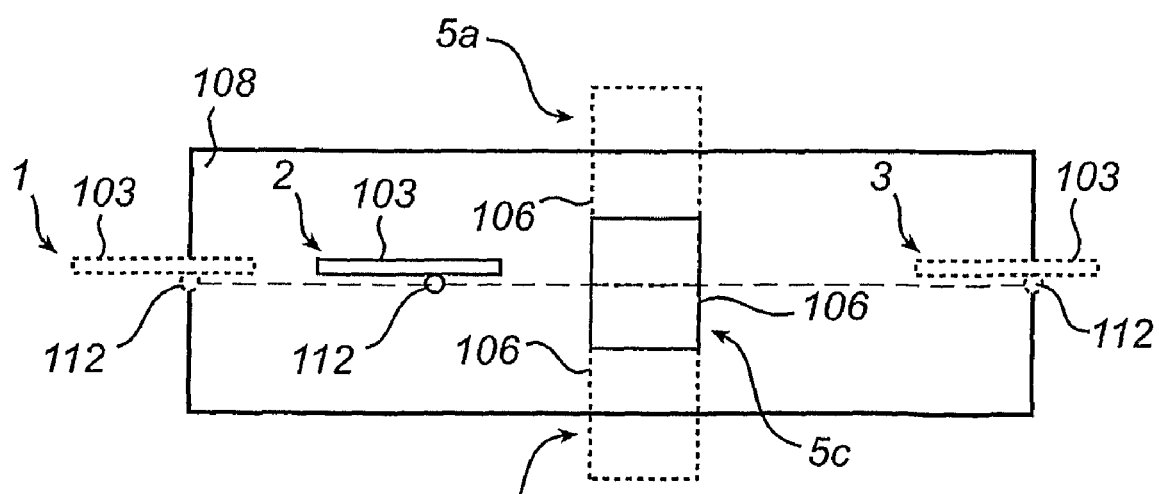

The working space 108 is a two-dimensional space, as illustrated in FIG. 1b, spanned by the positions at which the work head 112 and/or the target surface 106 can be positioned. The extreme or end positions at which said work head 112 can be positioned are illustrated by positions 1 and 3. The extreme or end positions at which said target surface 106 can be positioned are illustrated by positions 5a and 5b. The position of the target surface is in this embodiment measured with respect to a center coordinate of said support member 106. The length and width of the working space 108 corresponds to the longest possible displacement of the work head 112 and the target surface 106, respectively. In other words, the working space 108 is spanned by the initial portions of said first and second axis, respectively, 101, 102. A selected working space corresponds the portion of the working space 108 which is to be calibrated. The size of the selected working space, according to this embodiment, corresponds to the area of the portions of the support member positions 5a,5b,5c which are within said working space 108. According to another embodiment, the area of the selected working space is slightly narrower, since not the whole area of the support member is used. According to a third embodiment, the area of said selected working space is slightly wider, since the support port member 106 might be displaced in the x-direction.

A circuit board designer determines the layout of the circuits on the circuit board 121-124, and the desired positions for different components. These positions are entered into the pick and place machine and converted into nominal or machine coordinates. Circuit boards 121-124, which have been printed according to the determined layout, and which are provided with solder paste, flux, or adhesive at the respective desired positions for the electric components, are arranged in the target surface 106 of the machine. The control system of the machine directs the positioning system such that the work head 112 picks the correct type of component from a supply of components (not shown), and positions it at the desired location on the target surface 106 according to the determined layout. The exact position of the picked component in relation to the mount head is determined by a separate camera 113, and the machine compensates for any offsets in position or orientation before placing the component.

The adhesive, flux or solder paste will temporarily attach the component to the circuit board. Thereafter, in a similar manner, the next component is collected and placed at its desired position on the circuit board by the work head 112.

Figure 2A:
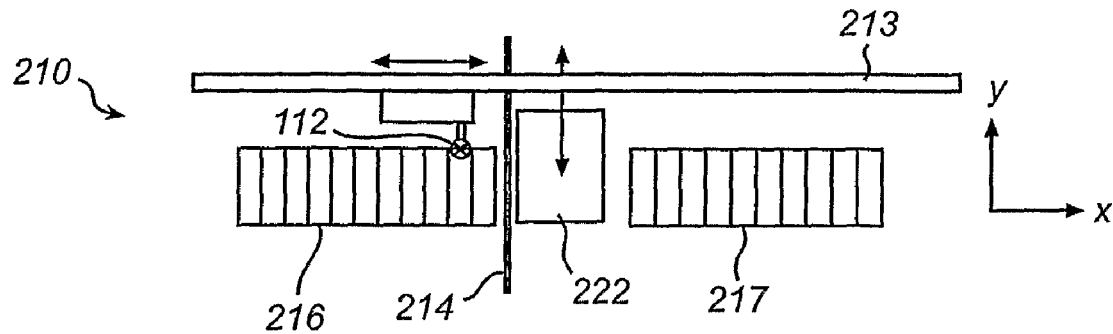
FIGS. 2a-2c show schematic overviews of different types of positioning systems.
Figure 2B:
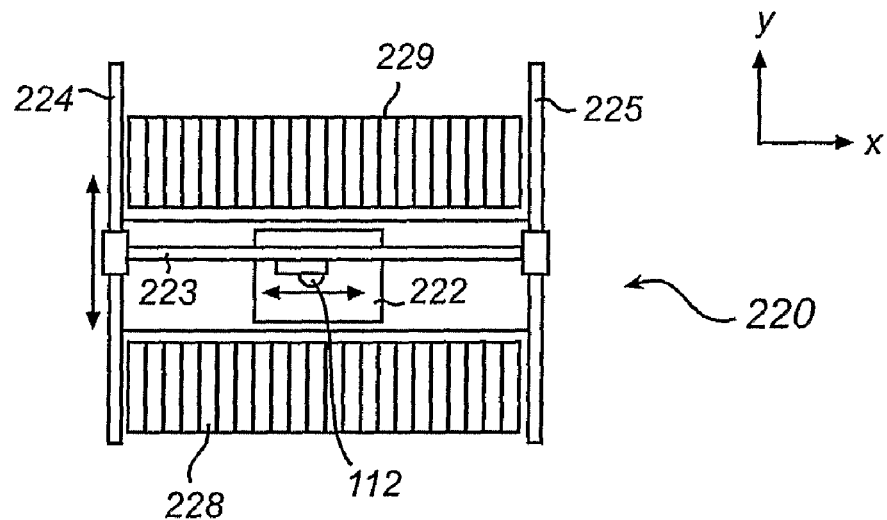
Figure 2C:
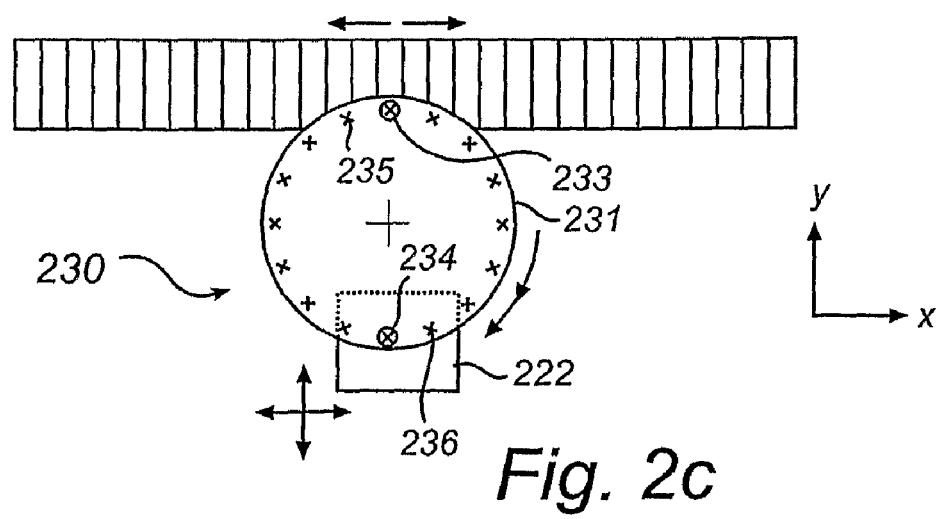

FIGS. 2a-2c schematically show some different ways in which a target surface and a work head can be moved in relation to each other, as known in the art. A split axis machine 210 has already been described in relation to FIG. 1 and a more schematic illustration is found in FIG. 2a. A work head 112 picks components from a component supply 216,217 and places them on a circuit board 222. The work head 112 can be positioned along a first linear guide 213, and the circuit board can be positioned along a second linear guide 214.

FIG. 2b schematically shows a gantry machine 220, wherein the target surface or circuit board 222 is kept stationary, while the work head 112 places the components picked from a component supply 228,229. The work head is movable in a first direction (X) along a first linear guide 223. Further, said first linear guide 223 is movable in a second direction (Y) along a second and a third linear guide 224,225.

FIG. 2c schematically shows a turret machine, wherein several work heads are used 233-236. The work heads are arranged in an annular fashion on a circular device 231. The target surface 222 is controllable in two directions (X and Y). Simultaneously as one work head 233 picks its respective component, the target surface is positioned such that a diametrically opposed work head 234 can place its component at a desired location on the target surface. Thereafter, the turret is rotated one step, and the next pair of work heads 235,236 picks and places, respectively, a component.

Figure 3A:
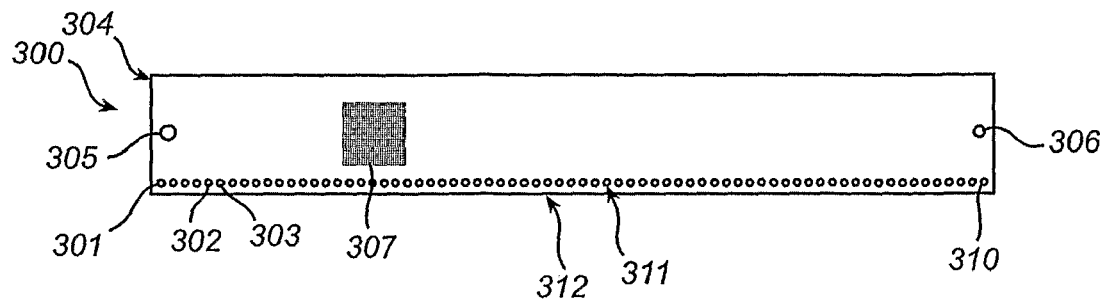
FIGS. 3a-3g show schematic embodiments of a reference device.

FIG. 3a shows a reference device 300 which has been designed for use when calibrating a positioning system, such as the ones described in relation to FIGS. 2a-2c, in accordance with the invention. The dimensions of the reference device 300 are preferably chosen with respect to the work head. In this case, the work head operates by use of vacuum. Basically, the work head comprises a thin metal cylinder, which is positioned against the flat surface of the reference device. Air is removed from the cylinder, such that the reference device is sucked against it, and the reference device can be lifted by the work head. A typical target surface is approximately 500 mm*500 mm. The reference device is a thin plate made of steel or glass, and e.g. approximately 150 mm long, 25 mm wide and 0.1 mm thick. A reference device of this size is suitable for a target surface of the size stated above. A first line or row 311 of discernable reference features, holes or etched markings is arranged along a first long side 312 of the plate. Each hole or marking 301,302,303,310 is approximately 1 mm in diameter, the center to center distance between two adjacent holes 302, 303 is approximately 2 mm, and the distance between the two holes 301,310, which are furthest apart in the row of holes, is 144 mm. The relative position of a reference feature $(f_{xi}, f_{yi})^{AC}$ equals the distance between the upper left corner 304 of the reference device and the respective reference feature or hole.

The plate is further provided with two orientation markings or two additional holes 305,306, 2 and 1.5 mm in diameter, respectively. The orientation markings 305,306 are centered one at each short end of the plate. The variation in size is a discernable difference between the two orientation markings 305,306. The markings are used by the image processing system in order to determine the orientation of the plate, e.g. which side of the plate that is facing upwards. The image processing system can use information about the orientation markings together with a knowledge of the position of the orientation markings in relation to the reference features, to determine the orientation of the reference device. Moreover, the plate is provided with a grid 307, which can be used when calibrating the image processing system. The grid pattern preferably comprises orthogonal lines, and is designed such that it extends across the whole field of view of the camera. The calibration of the image processing system is performed by adjusting the recorded camera image such that the lines in the image appear sufficiently orthogonal.

Figure 3B:
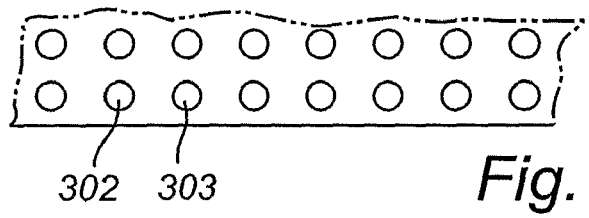

According to a second embodiment, a similar reference device as the one described in relation to FIG. 3a is used, but in this embodiment the reference features are arranged in two parallel rows, as is schematically illustrated in the partial view of the reference device shown in FIG. 3b.

Figure 3C:
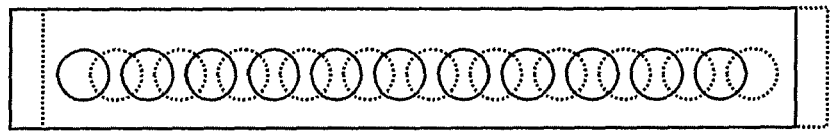

In order to compensate for high spatial frequency errors, which might occur when an error correction is based on calibration tables, the calibration pattern is preferably provided with reference markings which are arranged very close to each other. In practice it might be hard to achieve a sufficiently dense arrangement of the reference markings, as their diameter ought to be relatively large in order to make it possible to accurately locate them by use of the sensing device. One way to overcome this is to place the reference device at two overlapping calibration locations, which are separated by approximately half the center to center distance between two adjacent reference markings, as is schematically illustrated in FIG. 3c. On the other hand, placing the calibration pattern at two nearby positions with high enough accuracy might be difficult if the reference device has to be moved by hand.

Figure 3D:
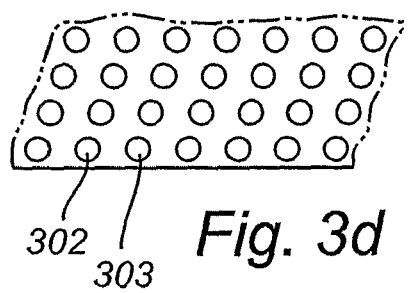
Figure 3E:
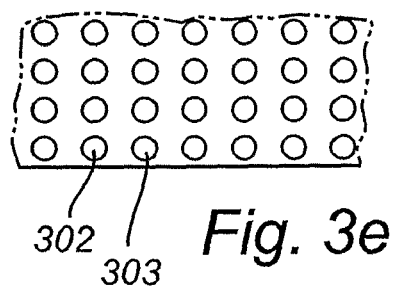

FIG. 3d shows a third alternative arrangement of the reference markings, as compared to the reference device described in relation to FIG. 3a. According to this embodiment, k number of rows are used, and each row of reference markings is displaced 1/k times the pitch of the holes, as compared to the adjacent rows. In the embodiment shown k equals 4. Hence, a more dense arrangement of the reference features is achieved. According to a fourth alternative arrangement, as shown in FIG. 3e, the reference markings are arranged in parallel rows and columns. When the reference device is positioned on the target surface, it is rotated an angle arctan (1/k). The angle is measured with respect to the axis along which the reference features are to be measured. These third and fourth arrangements will have the effect that the calibration will contain equidistant measurement data even if the calibration plate is not placed accurately on the target surface.

Figure 3F:
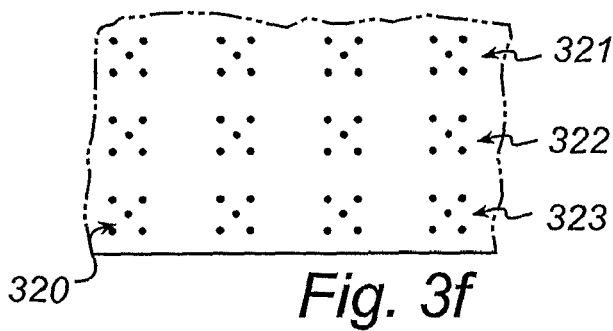

The holes or reference features can also be grouped into sets 320, which sets are distributed on the reference device at equidistant positions. FIG. 3f schematically shows a fifth alternative embodiment of the reference device, wherein a portion of the reference device is provided with etched reference features. Nine parallel lines of reference features are grouped into three rows 321-323, wherein each row comprises four sets of reference features. Further, each set 320 comprises five reference features arranged in a quincunx.

Figure 3G:
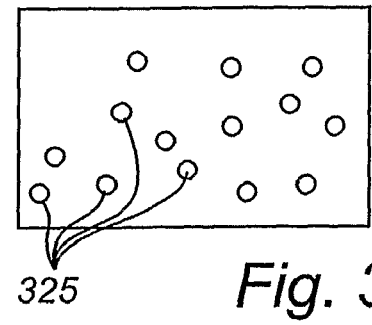

According to a sixth alternative embodiment, as shown in FIG. 3g, said reference features 325 are arranged in an irregular or quasi-irregular pattern, such that different reference features are separated by different distances.

When the calibration is performed according to the invention, a reference plate is placed at predetermined calibration locations. In this preferred embodiment a machine according to the one described in relation to FIG. 1 is calibrated by use of a reference plate similar to the one described in relation to FIG. 3a. The calibration locations are preferably chosen such that the length and width of the whole target surface 401 is covered. In this embodiment, the reference plate is arranged in several positions such that they describe a superimposed U and X.

Figure 4A:
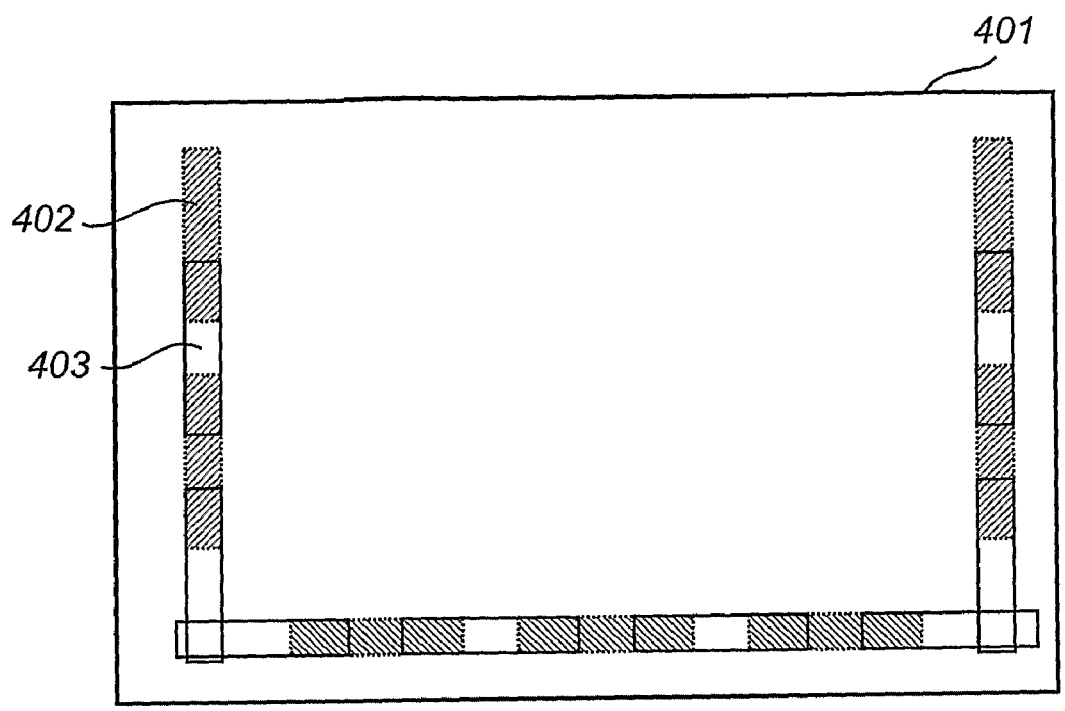
FIGS. 4a-4d schematically show predetermined calibration locations in a two dimensional selected working space.

To describe a U, the reference device is repositioned along three of the sides of the target space 401, wherein the plate is oriented such that the row of holes is arranged substantially along the respective side of the selected working space. FIG. 4a schematically shows different calibration location at which said reference device is placed. The center to center distance between two adjacent calibration locations 402,403 is preferably half the length of the reference plate 300, such that the plate will be positioned with an overlap with respect to several absolute coordinates.

Figure 4B:
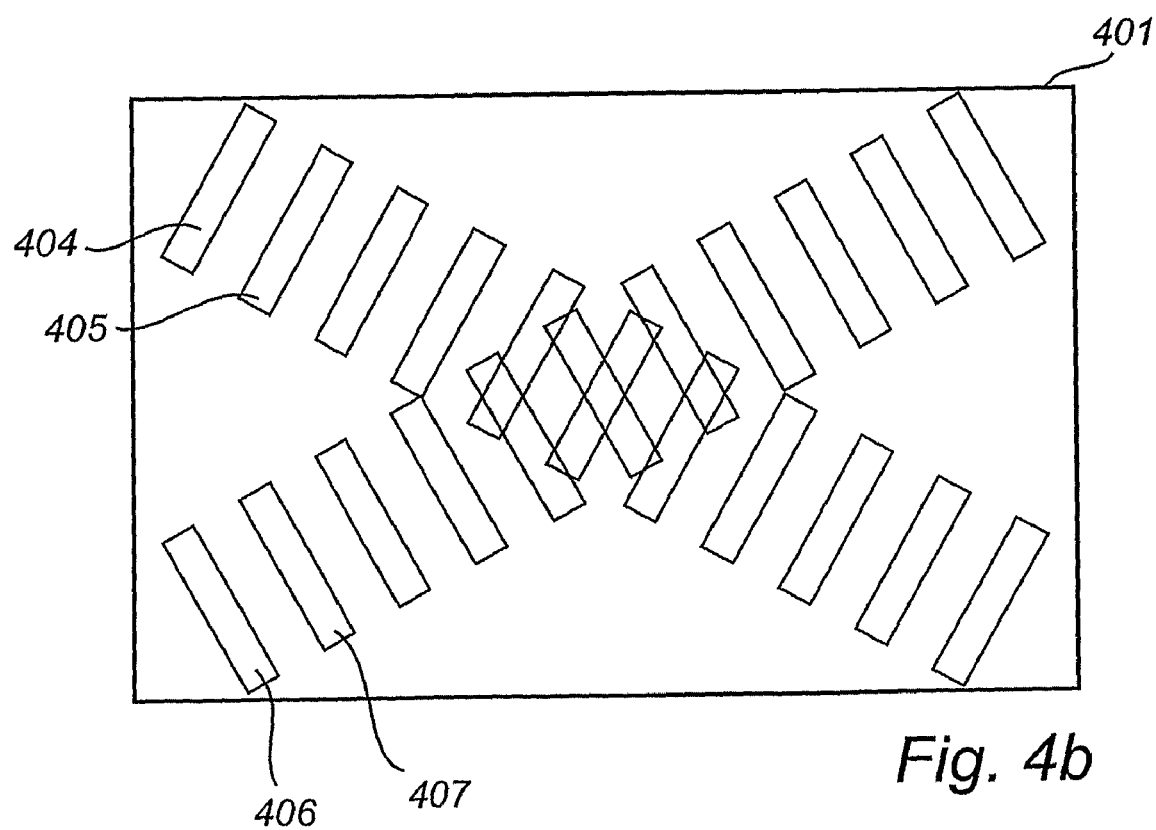
Figure 4C:
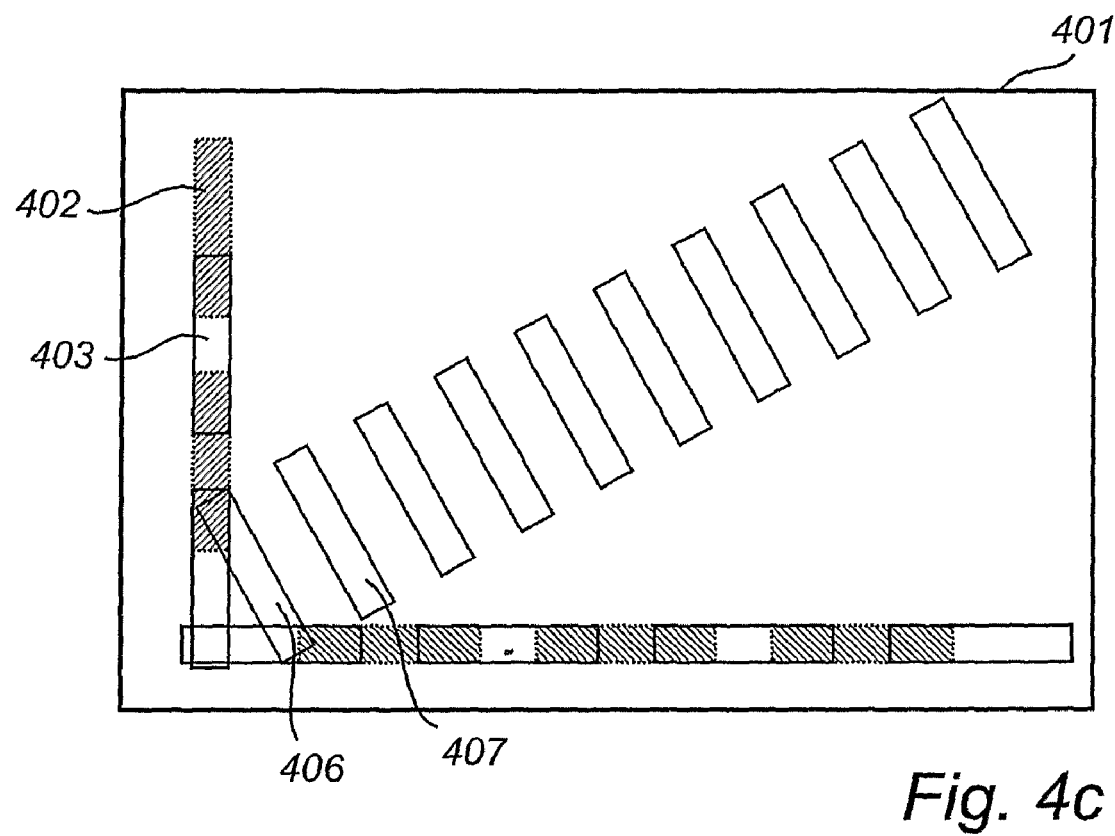

To describe an X, the reference device is repositioned along the diagonals of the selected working space, wherein the plate is oriented such that the row of holes is substantially orthogonal to the diagonal along which the plate is moved, as is schematically illustrated in FIG. 4b. When the reference device is placed such that it describes an X, it is placed with an overlap with respect to said first axis (X) for some calibration locations 404,406, and with an overlap with respect to said second axis (Y) for other calibration locations 406,407. To describe a superimposed U and X, the plate is positioned both in the positions described in relation to FIG. 4a and in the positions described in relation to FIG. 4b. FIG. 4c shows an alternative embodiment wherein the plate is placed with an overlap along two of the target surface sides and along one of the diagonals. A difference between the two different sets of calibration locations, shown in FIGS. 4a and 4b, and in FIG. 4c, respectively, is that the set described in relation to FIG. 4c does not provide as good statistical material as the one described in relation to FIGS. 4a and 4b. A better statistical material gives a more reliable calibration.

In FIGS. 4a, 4b and 4c the sum of all calibration locations describe a U, an X and L/respectively. In these examples, the area which is calibrated, by the measurement of said reference device at said calibration locations, forms a rectangle which is slightly smaller than said target surface 401. Here, as said first 101 and second axis 102 are orthogonal, the area which is calibrated extends in the direction of said first axis between the endpoints of a projection of all reference features comprised in all calibration locations on said first axis. Additionally, the area which is calibrated extends in the direction of a second axis between the endpoints, of a projection of all reference features comprised in all calibration locations on said second axis. In other words, the area which is calibrated corresponds to a rectangle defined by said projected reference features.

Figure 4D:
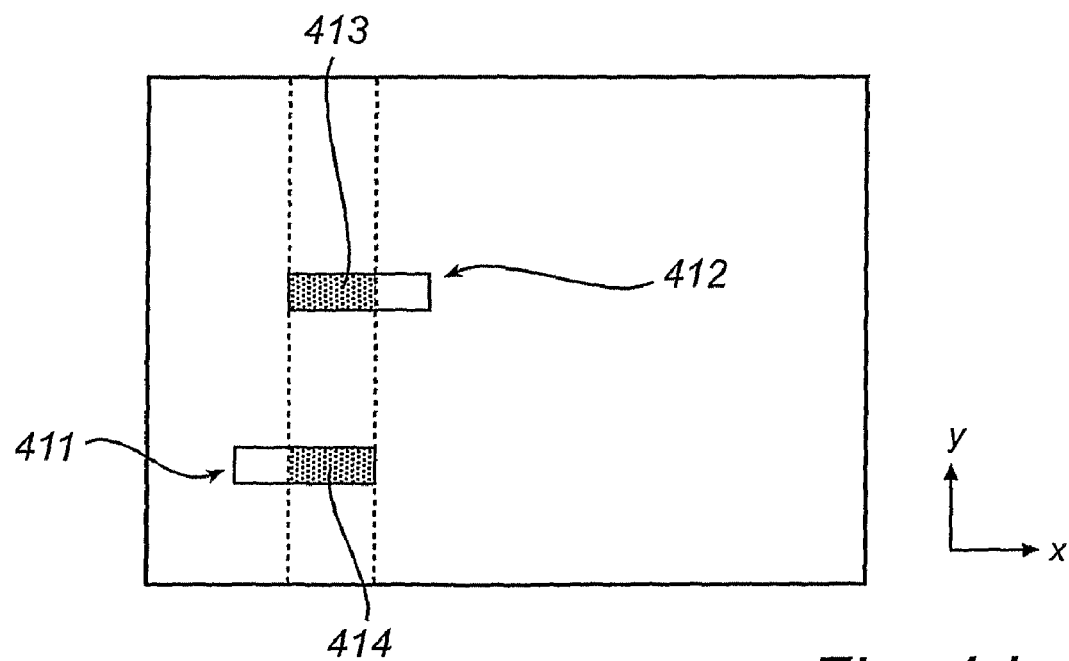

FIG. 4d schematically shows a first calibration location 411 and a second calibration location 412, which are spatially non-overlapping. Further, a first portion 414 of said first calibration location 411, and a first portion 413 of said second calibration location 412, both correspond to the same portion of the X-axis, although different portions of the Y-axis. Hence, said portions 413,414 are arranged at the same portion of the working space with respect to said X-axis. When the calibration is performed with respect to the X-axis these locations can be used instead of, or as a complement to, two spatially overlapping locations.

Figure 5:
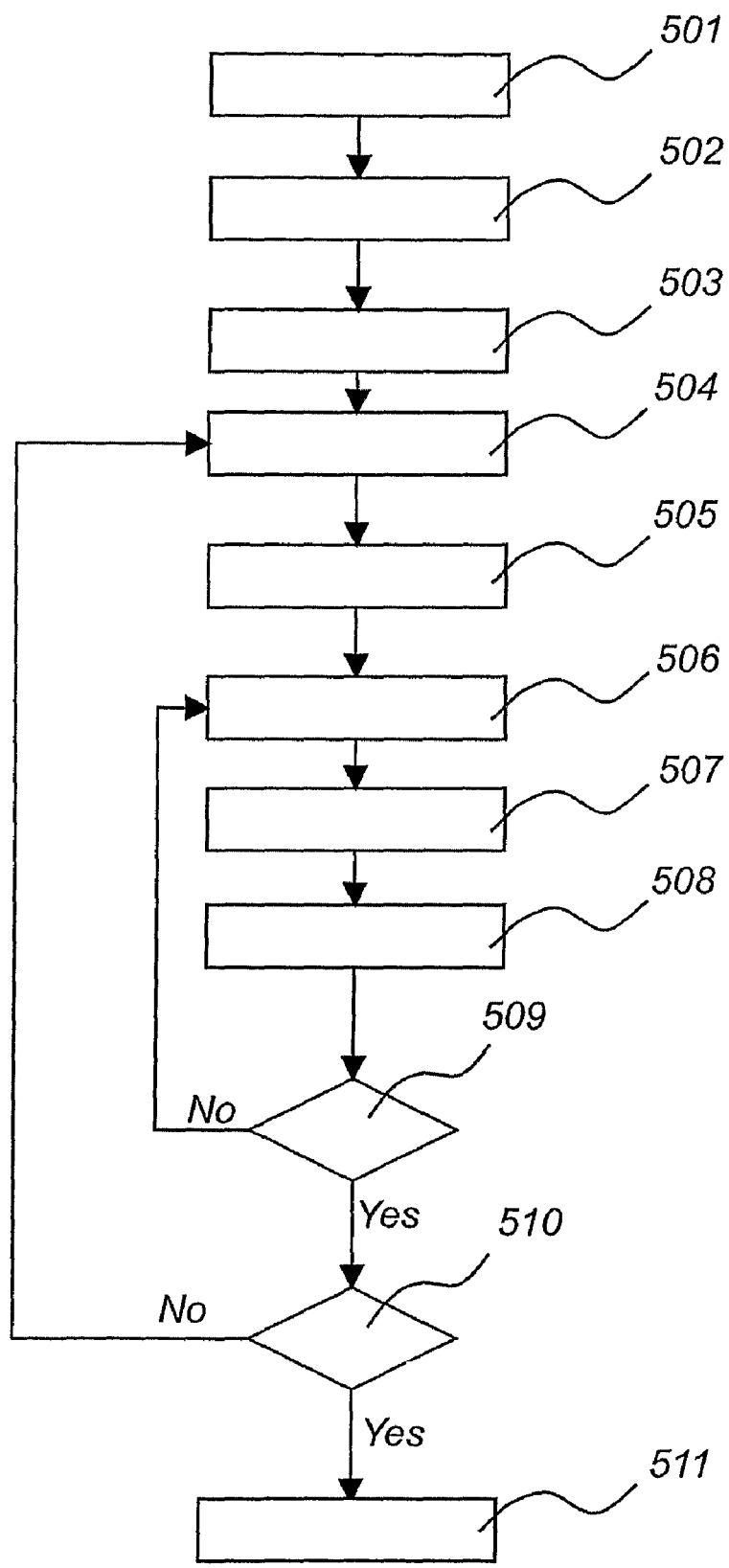
FIG. 5 is a flowchart describing a calibration process according to one embodiment of the invention.

The calibration of the positioning system can be performed in the following manner, as is illustrated by the flowchart in FIG. 5. In this embodiment, a reference plate similar to the one which was described in relation to FIG. 3 is used. First, there is an initial preparation of the system 501-503. Numerical default values are selected for the conversion parameters, and entered into the machine 501. There are different ways of selecting the default values. One way is to assume that the machine coordinates are perfectly orthonormal and adjust the default values accordingly. Another, is to determine the conversion parameters accurately at the manufacture of a machine, and deliver these together with the machine, such that the delivered default values are tailor-made for that machine. A third way, is to use a typical set of conversion values, which is known to work well.

Further, the user indicates the area that is to be calibrated 502, i.e. the selected working space, and the system automatically determines suitable calibration locations, herein sometimes referred to as selected calibration locations, as well as the desired orientation of the reference device at each selected calibration location. Additionally, reference features which are to be measured at each selected calibration location, herein sometimes referred to as selected reference features, are determined. An equation system comprising parameters describing the theoretical position in actual coordinates of the selected reference feature for each selected calibration location; the conversion parameters, which is to be calibrated; and empty entries for the positions of the selected reference features are provided to a set of computing means 503.

Thereafter, the measurement phase is initiated. A first calibration location is randomly selected from the set of selected locations 504. This first calibration location is thereafter deleted from the list of selected calibration locations. The reference device is placed by the work head 505, at approximately said first calibration location and with approximately the desired orientation. A first reference feature is randomly chosen 506, from the list of selected reference features corresponding to said first calibration location. The first reference feature is thereafter deleted from the list of selected reference features corresponding to said first calibration location. The sensing device is brought by the positioning system to the approximate position of said first reference feature 507. The approximate position is computed by the use of said first calibration location, and the relative position of said reference feature. At said approximate position, the sensing device first determines the location of the orientation markings. This is performed in order to compensate of possible scale errors, due to e.g. a sloping target surface. It is also performed in order to get a better indication of the location of the reference features, in order to facilitate the determination of their position. Thereafter, the nominal coordinates which describes said reference feature is fed to the set of computing means 508. A second reference feature is randomly selected from the list of selected reference features 506, and the above described procedure is repeated until it is determined 509 that all of said selected reference features corresponding to said first calibration location have been measured. Thereafter, a second calibration location is randomly selected from the list of selected calibration locations 504, and each position of the selected reference features corresponding to said second calibration location are measured and forwarded 508 to the computing means, in a similar manner as was described in relation to said first calibration location 505-509. The procedure is repeated until it is determined 510 that all selected reference features have been measured 509 for all selected calibration locations 510.

Finally, an equation system, which comprises the following two rows for each returned reference feature position:

$$r_x^{AC} + \cos(v) * f_{x1}^R - \sin(v) * f_{y1}^R = f_{1x}(n_x^N) + f_{2x}(n_y^N)$$

$$r_y^{AC} + \sin(v) * f_{x1}^R + \cos(v) * f_{y1}^R = f_{1y}(n_x^N) + f_{2y}(n_y^N) + f_{3y}(n_y^N) * n_x^N,$$

is solved or optimized 511, such that the conversion values are calibrated. In the above equation system, the functions $f_{1x}$, $f_{2x}$, $f_{1y}$, $f_{2y}$ and $f_{3y}$ are said conversion functions; $(n_x, n_y)^N$ said returned reference feature locations in nominal coordinates; $(f_{x1}, f_{y1})^R$ is the position of the reference feature with respect to a point of reference on the reference device; $(r_x, r_y)^{AC}$ is the position of a point of reference on the reference device in actual coordinates, e.g. the upper left corner; and v indicates the angle between the reference device and the x-axis. The above expressions are all initially unknown, except $(n_x, n_y)^N$ which numerical values have been measured.

Some boundary conditions are introduced into the equations. The relative location of a first reference feature, e.g. the left most reference feature in the row of reference features, is set to $f_1 = (0,0)$ for all equations. A second reference feature, diametrically opposed to said first reference feature, is set to $f_n = (xLength, 0)$ for all equations, wherein xLength is an approximate length of the row of reference features, e.g. 144 mm. The offset and inclination of the calibration plate in said first calibration location is set to $(r_x, r_y)_1^{AC} = (0,0)$ and $v_1 = 0$, respectively. Further, for one actual coordinate $Y_0^{AC}$, three of said conversion parameters are set to 0, $f_{2x}(Y_0^{AC}) = 0$, $f_{2y}(Y_0^{AC}) = 0$, $f_{3y}(Y_0^{AC}) = 0$. The number of calibration locations are preferably chosen such that there are 3.5 times as many equations as there are unknowns. With these 10 equality constraints, the least square problem has a unique solution.

The equation system is mildly non-linear, due to the unknown angles of the calibration plate at the calibration locations. The Gauss-Newton method starts with an initial guess, linearizes the system at the guessed solution and computes a correction by solving the resulting linear least squares problem. When linearizing the system, the Jacobian matrix is needed, e.g. the matrix of all partial derivatives. Since a good initial guess can easily be determined by assuming that the machine is perfect, the Gauss-Newton method will converge very quickly to the global optimum. Typically, two iterations are enough to achieve sufficient accuracy.

The equation system is quite large, and might be too large to handle on computers running in the assembly machines. However, the equation system is sparse, and taking advantage of this fact makes it possible to speed up the computation significantly.

Although the invention has been described in relation to a split axis pick-and-place machine with a two-dimensional target surface and a two-dimensional selected working space, it can be successfully applied to many other types of positioning systems. For example, the method can be used-for calibrating the positioning system of a dispensing machine, which dispenses e.g. adhesive or solder paste on circuit boards at locations on the boards where electric components are to be attached, for instance as described in WO99/64167 and WO00/62587. The dispensing machine can be arranged substantially as the machine described in relation to FIGS. 1a and 1b. A dispensing machine usually has a different type of work head. Instead of the work head being arranged for picking and placing components, the work head is arranged for dispensing e.g. adhesive or solder paste on circuit boards. The reference device can be placed manually on the target surface, or by a separate work head which is e.g. arranged adjacent to the sensing device 111. In one embodiment the dispensing head is comprised in a dispensing cassette, which can be exchanged for a calibration cassette, when the machine is to be calibrated. The calibration cassette comprises a work head for repositioning of the reference device on the target surface. After the calibration has been completed the calibration cassette is removed, and the dispensing cassette is repositioned. Thereafter, the dispensing process can be initiated.

The method can also be applied to many different types of positioning systems, those described in relation to FIG. 2a, 2b and 2c are only three non-limiting examples.

Additionally, the present calibration method can be applied to both one and three-dimensional selected working spaces.

The invention claimed is:

1. A method of self calibrating a positioning system for positioning an element in a working space, comprising the steps of:
providing a system of actual coordinates, a system of nominal coordinates, and a set of conversion functions for converting between the actual and nominal coordinates, wherein each of said functions is determined by at least one conversion parameter;
positioning a reference device by a work head at a plurality of different calibration locations in said working space by sequentially repositioning said reference device to one of said plurality of different calibration locations at a time, wherein said reference device comprises a plurality of discernable reference features arranged at substantially fixed relative positions;
sensing, for each one of said plurality of different calibration locations at which said reference device is positioned, the position of at least any two of said reference features of said reference device in nominal coordinates by non-contact measurements using a camera connected to an image processing system; and
selecting a numerical value for each of said conversion parameters such that the differences in relative positions of said reference features expressed in said actual coordinates are reduced for each one of said plurality of different calibration locations.

2. The method according to claim 1, wherein said step of selecting a numerical value is performed such that said differences are minimized.

3. The method according to claim 2, wherein said step of positioning said reference device further comprises positioning different portions of said reference device in the same portion of said working space, with respect to at least a first axial direction, for at least two different calibration locations.

4. The method according claim 2, wherein said step of positioning said reference device is performed by a work head controlled by said positioning system.

5. The method according to claim 1, wherein said step of positioning said reference device further comprises positioning different portions of said reference device in the same portion of said working space, with respect to at least a first axial direction, for at least two different calibration locations.

6. The method according to claim 5, wherein said step of positioning different portions of said reference device in the same portion of said working space is performed such that said portions are positioned at spatially overlapping calibration locations.

7. The method according claim 6, wherein said step of positioning said reference device is performed by a work head controlled by said positioning system.

8. The method according to claim 1, wherein an optimization of an overdetermined system of equations is used for selecting said numerical values, and said system of equations comprises at least a set of nominal coordinates, said conversion functions and a representation of said sensed positions in actual coordinates.

9. The method according to claim 5, wherein said step of positioning said reference device is performed by a work head controlled by said positioning system.

10. The method according to claim 1, wherein said step of positioning said reference device is performed by a work head controlled by said positioning system.

11. The method according to claim 1, wherein the step of positioning said reference device comprises positioning said reference device at said calibration locations in a substantially random order.

12. The method according to claim 1, wherein the step of sensing said reference features at a calibration location comprises sensing said reference features in a substantially random order.

13. The method according to claim 1, wherein said positioning system is used in a machine for circuit board manufacturing, which comprises an element selected from the group of component placement heads, dispensing heads, optical inspection heads and X-ray inspection heads.

14. The method according to claim 1, wherein said reference features are fiducial markings provided on said reference device.

15. The method according to claim 1, wherein said step of positioning said reference device comprises positioning it on a two-dimensional target surface.

16. The method according to claim 15, wherein said reference device is substantially smaller than said target surface, preferably occupying less than half of said target surface, and even more preferably occupying less than a quarter of said target surface.

17. The method according to claim 1, wherein said reference device is a plate, preferably provided with at least one row of fiducial markings.

18. The method according claim 8, wherein the optimization is made assuming that the relative distances between the reference features remain substantially unchanged between said plurality of different calibration locations.

19. The method according to claim 8, which further comprises the step of using a residual vector of said equation system in order to determine the accuracy of the computed solution.

20. The method according to claim 8, wherein the steps of positioning the reference device at additional calibration locations, sensing the position of at least two reference features, and selecting numerical values are repeated until the standard deviation of said residual vector is smaller than a predetermined value.

* * * * *